Aug. 11, 1936. T. J. BOERNER 2,050,418
AIRCRAFT RADIO ALTIMETER
Filed Jan. 30, 1935
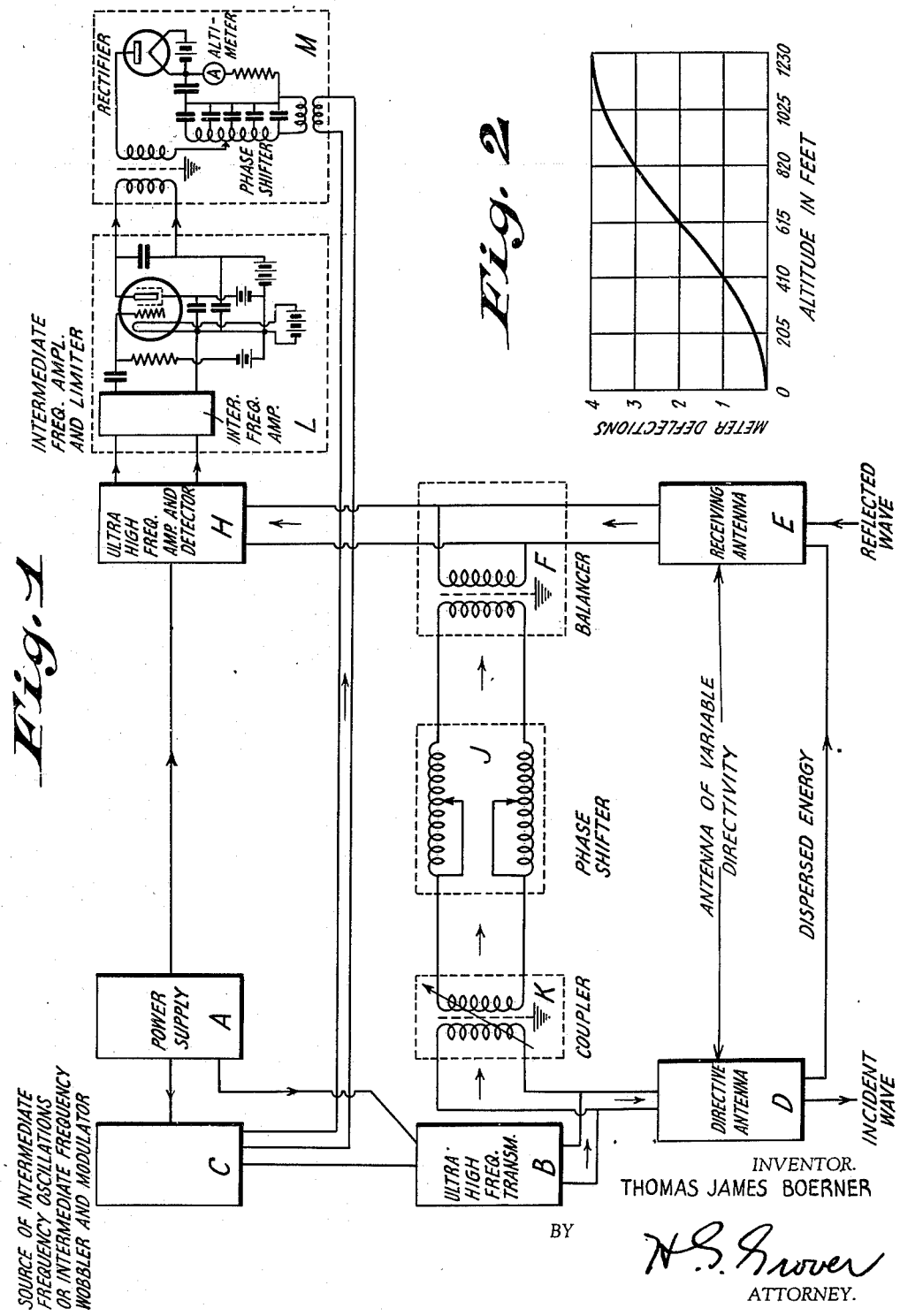
INVENTOR.
THOMAS JAMES BOERNER
BY
ATTORNEY.

Patented Aug. 11, 1936

2,050,418

UNITED STATES PATENT OFFICE 2,050,418

AIRCRAFT RADIO ALTIMETER

Thomas James Boerner, West Collingswood, N. J., assignor to Radio Corporation of America, a corporation of Delaware Application January 30, 1935, Serial No. 4,127

6 Claims. (Cl. 250—1)

The present invention concerns a method of and means for determining the distance from a moving craft such as an airplane and an object such as the earth or a mountain or another moving vessel. The invention involves the use of radiant energy waves in a novel manner.

Heretofore, systems of the type involved in the present invention used the principle that standing radio waves are produced by reflection from any conductive reflecting object when radio frequency energy is radiated from the plane or moving object. The nodes and loops of the standing waves produced by the reflected and the direct wave has been detected by a receiver on the plane or moving object, thus giving an indication of the altitude of the plane from the ground or the distance from the plane to the mountain or other object. It is obvious that if such a system as known heretofore in the art is to be effective, it must utilize wave lengths of the order of 1,500 meters or more, because any attempt by the pilot or operator to count the number of nodes or loops of the standing wave which he has passed while ascending or descending results in confusion, due to the close spacing of said nodes or loops. The use of 1,500 meters requires a bulky antenna system and in addition the available frequencies in this portion of the frequency spectrum are congested, so that interference from other stations may cause erroneous readings.

The object of the present invention is to produce a method of and means for determining the distance between a moving vessel and any reflecting object which is free of the defects inherent in systems of this type known heretofore. The method and means of the present invention uses ultra high frequency energy which is modulated or wobbled at a comparatively low frequency, such as 200 kilocycles. The altitude indication is obtained in accordance with the present invention by measuring the phase difference between the local and the reflected 200 kilocycle components of the ultra high frequency wave energy.

The novel features of my invention have been pointed out with particularity in the claims appended to the specification. The nature of my invention and the manner in which the same is carried out will be better understood by the following detailed description thereof when read in connection with the attached drawing, in which:

Fig. 1 illustrates somewhat diagrammatically the essential elements of a distance measuring device arranged in accordance with the present invention, while Fig. 2 is a graph in which meter deflections are plotted against altitude. The graph serves to illustrate the operation of the present invention.

Referring to the drawing and in particular to Fig. 1, A is a power supply unit which, as indicated, supplies all voltages needed for operating the equipment. The equipment utilizes thermionic tubes and therefore this source supplies anode potentials, control grid biasing potentials, filament heating potentials, and any other necessary potentials or currents. The source A may consist of an accumulator or an alternating current generator and a rectifier or any other known source. Where the energy is generated on the plane, the generator may be driven by the motive power of the plane or by propeller slip stream energy, or in any other manner known in the prior art. The power supply per se forms no part of the present invention, and the details thereof need not be described herein.

The unit B represents an oscillator preferably of the thermionic type. This unit may also include power amplifiers of the thermionic type. The oscillator and/or the amplifiers are preferably tunable and supply oscillations of substantially constant frequency which frequency may be varied continuously through a frequency range from 60 to 600 megacycles.

The high frequency energy produced in B is acted on by energy from the unit C and is either "wobbled", that is, frequency modulated, or modulated in amplitude by a comparatively low frequency wave, such as for example a wave of 200 kilocycles. The kilocycle source may be included along with the modulator tubes in the unit C and may be of the thermionic type of any other desirable type of low frequency oscillation generator. Where amplitude modulation of the high frequency wave is accomplished, the Heising method of modulation may be used. The carrier wave in B, however, is preferably frequency modulated or "wobbled" in any well known manner by the wave of 200 cycles from C.

The modulated high frequency energy is fed from the transmitter B to a directive antenna system D which, by reason of the short wave length used, may be made very compact and highly directive. The unit D may also be mounted by way of a universal joint on the plane structure so as to enable the operator or pilot to project the wave in any desired direction.

The receiving antenna E is also located on the plane and is preferably spaced as far from the radiator system D as the structure of the plane fuselage will permit. The receiver antenna may be nondirectional but preferably is adjustable and directive.

The energy picked up by the receiving antenna system E is supplied by way of a balancer F to the high frequency amplifier and detector unit H. The balancer F couples a voltage characteristic of the modulated carrier wave to the receiving antenna. The voltage is made equal in amplitude but opposite in phase to the voltage induced in the received antenna by the energy radiated directly from the transmitter antenna. In this manner I compensate the effect of the directly radiated wave on the receiver and insure a correct reading. The balancer may be a simple transformer as shown in Fig. 1 in which a static shield is interposed between the two windings so that only electromagnetic and not electrostatic coupling is obtained.

The receiving antenna will in practice be located several wave lengths from the transmitter antenna and preferably a phase shifter J is interposed as shown in the line supplying the balancing of compensating voltage from the transmitter to the receiving antenna. This phase shifter may be of any known type. In its simplest form the phase shifter may be as a variable inductive arrangement or any other device capable of varying the length of the transmission line between the transmitter B and the balancer F a range of one-half a wave length.

K represents a variable coupler device by means of which the amplitude of the balancing or compensating voltage supplied from B to the phase shifter J may be varied. The coupler K may consist of a simple transformer in which an electrostatic shield is interposed between the two windings and in which the output voltage may be varied by rotating one coil with respect to the other to increase or decrease the coupling between coils. The phase shifter J may consist of a pair of continuously variable inductors, one in each line. These inductors effectively increase or decrease the length of the line between K and F as the inductance is increased or decreased respectively.

The high frequency amplifier in H raises the level of the received signal through an ultra high frequency amplifier and demodulates or rectifies the signal by means of a novel thermionic detector. The intermediate frequency or 200 kilocycle output from the detector passes through a unit L which includes an intermediate amplifier by means of which the level of the intermediate frequency wave is increased. The amplified energy is fed from the output of the intermediate frequency amplifier in L to a thermionic limiter which maintains the output voltage from L constant regardless of reflected field intensity at the receiving antenna E. The limiter in L may be any of several different forms one of which is as shown a class "C" amplifier with grid bias obtained partly from its own rectified grid current and partly by means of a source of grid bias.

The output voltage of the amplifier and limiter in L and a voltage of the same amplitude and frequency from unit C are both fed into a phase differential detector M which detects the phase difference between the low frequency oscillations produced in C and the oscillations on the reflected wave. The phase differential detector in M includes a meter in which the phase difference between the wave in C and the energy characteristic of the reflected wave in M is converted into altitude or distance indicating readings. The reading in M may be calibrated directly in feet.

In Fig. 1 I have shown one way in which the phase difference between the low frequency wave from C and the energy representative of the reflected and compensated wave from E may be detected, compared and recorded. The voltage at the rectifier in M will be that obtained by combining the two out-of-phase sine wave voltages and will be of the same frequency as either wave, but will vary in amplitude from 0 to twice the amplitude of either wave as the phase displacement between the two waves varies from 180° to 0°. The rectified current in the ammeter A will be proportional to the square of the combined voltages. No appreciable phase displacement should be produced in the wave from C by the equipment when a 200 kilocycle wave is used. However, a phase shifter as shown in Fig. 1 comprising an inductive and capacitive net-work may be used to advantage to impress the wave from C the grid cathode circuit of the rectifier tube as explained below.

If no phase shifter is used and the altimeter A is an ordinary direct current milliameter, the deflections of the pointer of A will follow the curve of Fig. 2. This condition would probably be objectionable to the operator, since he is most interested in accurate readings at the lower altitudes or shorter distances, such as 100 feet. If the meter is biased so that it reads "negative 2", the wobbler frequency one-halved to 100 kilocycles, and the initial phase displacement adjusted to 90° on the ground, the meter would then read "0" on the ground and the reading would increase rapidly for a small increase in altitude near the ground, but would taper off as the altitude approaches 1230'. The same effect may also be obtained without the use of the phase shifter by using a meter with specially designed pole pieces.

The phase shifter interposed between the source of low frequency currents and the input of the rectifier in M may comprise an artificial line including series inductances and parallel capacities connected as shown. The artificial line may be one-half a wave length long or longer at 200 or 100 kilocycles. A radio goniometer may also be used as the phase shifter.

For the case assumed above, the altimeter of the present invention will be useful up to 1230 feet or a one-quarter wave length at 200 kilocycles. It may be made useful from 1200 feet to 12,000 feet if the operator is provided with a control for changing the wobbler frequency to 20 kilocycles, and the corresponding change in intermediate frequency tuning all in one operation. Likewise, the instrument may be used as an accurate landing altimeter effective up to 1200 feet by a similar shift of modulating frequency up to 2000 kilocycles. No specially designed bandpass amplifier will be necessary to pass this high modulated frequency since the carrier frequency is from 20 to 200 times the wobbler frequency.

The altimeter of the present invention may be used to give a continuous indication of height about ground regardless of atmospheric conditions of visibility. It will also give an indication to the pilot as to the character of the terrain over which he is flying. The altimeter may be used as an accurate landing device, as well as a device to indicate high altitude.

The directive radiating and receiving elements permit the pilot to direct the beam and receive the reflected wave from any direction, as for example straight ahead, so that he may be warned of his approach to any obstructions, such as mountains or buildings, or to moving obstructions, such as another plane flying the same course of his special direction.

The necessary potentials for all of the tube elements of the tubes used in the intermediate frequency amplifier and limiter in L and for the rectifier in M may be drawn from the main power supply A, or separate supply sources may be used for any or all of the tubes. For the sake of clearness I have shown separate sources for the tubes illustrated in L and M. Moreover the main supply unit may be connected to the intermediate frequency amplifier in L to supply all necessary power thereto.

What I claim is:

1. The method of measuring the distance between a source of carrier wave energy and a reflecting object which includes the steps of, impressing oscillations of relatively low frequency on said carrier wave energy, directively radiating the resultant energy, receiving said resultant energy at said source when reflected from said object, limiting the amplitude of said resultant energy, demodulating the rceived and amplitude-limited energy, shifting the phase of waves from said low frequency source, combining the demodulated energy with the phase shifted energy from said relatively low frequency source, and rectifying the combined energy.

2. The method of measuring the distance between a source of carrier wave energy and a reflecting object which includes the steps of, impressing oscillations of relatively low frequency on said carrier wave energy, directively radiating the resultant energy, receiving said energy at said source when reflected from said object, demodulating said received energy, limiting the amplitude of the energy demodulated and comparing the phase of a component of said demodulated limited energy with the phase of oscillations of like amplitude of said relatively low frequency.

3. The method of measuring the distance between a source of carrier wave energy and a reflecting object which includes the steps of, impressing oscillations of relatively low frequency on said carrier wave energy, directively radiating the resultant energy, receiving said energy at said source when reflected from said object, impressing on said received energy compensating energy from said source of relatively low frequency, demodulating said received and compensated energy, limiting the amplitude of said demodulated energy and comparing the phase of a component of said demodulated energy with the phase of said oscillations of relatively low frequency.

4. In a device for determining the distance between a source of carrier waves and a reflecting object, a source of relatively low frequency oscillations, a source of carrier wave oscillations, a frequency modulator connected with said source of relatively low frequency, said modulator being energized by carrier waves from said source, a directive radiator connected with said modulator, an absorption member, an amplifier and demodulator coupled to said absorption member, an intermediate frequency amplifier and amplitude limiter coupled to said ultra high frequency amplifier and demodulator, a phase detector and indicator coupled to said intermediate frequency amplifier and amplitude limiter, a coupling between said source of oscillations of relatively low frequency and said phase detector, and phase shifting means in said last named coupling.

5. A device for determining the distance between a source of carrier waves and a reflecting object comprising in combination a source of relatively low frequency oscillations, a modulator connected with said source of relatively low frequency oscillations, said modulator also being energized by carrier waves, an antenna connected with said modulator, a receiver including an antenna and an amplifier, a coupling between said modulator and said antenna, a demodulator and an indicator coupled to said amplifier, and a coupling between said source of oscillations of relatively low frequency and said demodulator, and phase shifting means in said last named coupling.

6. In a device for determining distance, a source of carrier waves, a source of relatively low frequency oscillations, means for modulating the carrier wave energy with energy from the low frequency source, means for directively radiating the resultant energy toward an object the distance to which is to be determined, means for receiving some of that energy when reflected back from said object, an amplitude limiter and demodulator responsive to the reception of said energy, means for shifting the phase of the energy from the low frequency source and for feeding the same directly to said demodulator thereby to combine the directly propagated energy with the reflected energy, and indicating means responsive to the combined output energy from said demodulator.

THOMAS JAMES BOERNER.